(12) United States Patent
Lee et al.

(10) Patent No.: US 9,348,460 B2
(45) Date of Patent: May 24, 2016

(54) TOUCH SENSOR INTEGRATED TYPE DISPLAY DEVICE

(71) Applicant: LG Display Co., Ltd., Seoul (KR)

(72) Inventors: JongBeom Lee, Paju-si (KR); SeEung Lee, Bucheon-si (KR); Hanna Choi, Paju-si (KR); Chansoo Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/823,816

(22) Filed: Aug. 11, 2015

(65) Prior Publication Data

US 2016/0048267 A1    Feb. 18, 2016

(30) Foreign Application Priority Data

Aug. 14, 2014  (KR) .................. 10-2014-0105684

(51) Int. Cl.
*G06F 3/041* (2006.01)
*G06F 3/045* (2006.01)

(52) U.S. Cl.
CPC .............. *G06F 3/0418* (2013.01); *G06F 3/045* (2013.01); *G06F 2203/04103* (2013.01)

(58) Field of Classification Search
CPC ....... G06F 3/044; G06F 3/045; G06F 3/0412; G06F 3/0418; G06F 2203/04103
See application file for complete search history.

(56) References Cited

U.S. PATENT DOCUMENTS

2006/0028591 A1    2/2006  Kim
2006/0176285 A1*   8/2006  Lee .................... G02F 1/13338
                                                                345/173
2012/0154308 A1    6/2012  Jeon et al.
2012/0274603 A1*  11/2012  Kim .................... G06F 3/0412
                                                                345/174
2013/0258223 A1   10/2013  Tanaka et al.
2014/0078420 A1*   3/2014  Liu ..................... G06F 3/0412
                                                                 349/12
2014/0168539 A1    6/2014  Kim et al.

FOREIGN PATENT DOCUMENTS

EP      0745885 A2    12/1996
EP      2447813 A2     5/2012
EP      2728450 A2     5/2014

OTHER PUBLICATIONS

European Extended Search Report, European Application No. 15181068.6, Jan. 19, 2016, 8 pages.

* cited by examiner

*Primary Examiner* — Liliana Cerullo
(74) *Attorney, Agent, or Firm* — Fenwick & West LLP

(57) ABSTRACT

Touch sensor integrated type display device improving touch sensibility. The touch sensor integrated type display device includes a plurality of gate lines and data lines configured to cross over each other, a plurality of thin film transistors disposed at crossings of the gate lines and the data lines, a plurality of pixel electrodes configured to be respectively connected to the thin film transistors and disposed between the data lines so that each of the gate lines crosses over pixel electrodes disposed on a same line, a plurality of touch electrodes configured to overlap the gate lines and the data lines without contacting and overlapping the pixel electrodes, a plurality of touch routing wires configured to be respectively connected to the touch electrodes and arranged in parallel with each other, and a common electrode configured to overlap the data lines, the gate lines, the pixel electrodes and the touch electrodes.

12 Claims, 7 Drawing Sheets

TOUCH SENSOR INTEGRATED TYPE DISPLAY DEVICE

This application claims the benefit of Korean Patent Application No. 10-2014-0105684 filed on Aug. 14, 2014, which is incorporated herein by reference for all purposes as if fully set forth herein.

BACKGROUND OF THE INVENTION

1. Field of the Invention

Embodiments of the invention relate to touch sensor integrated type display devices, in particular touch sensor integrated type display devices capable of improving touch sensibility.

2. Discussion of the Related Art

In recent years, flat panel displays (hereinafter referred to as "display devices"), which are able to be manufactured as a large-sized display device at a low price and have high display quality (including capability of displaying a motion picture, resolution, brightness, contrast ratio, color representation capability, etc.), have been developed to meet the needs capable of appropriately displaying multimedia with the development of the multimedia. Various input devices, such as a keyboard, a mouse, a track ball, a joystick, and a digitizer, have been used to allow a user to interface with the flat panel display devices.

However, when the user makes use of these input devices, the user's dissatisfaction increases because the user is required to learn how to use the input devices and the input devices occupy space, thereby making it difficult to achieve a high level of completeness in the products. Thus, a demand for a convenient and simple input device for the display device capable of reducing erroneous operations is increasing. In response to the increased demand, a touch sensor has been proposed to recognize information when the user inputs the information by directly touching the screen or approaching the screen with his or her hand or a pen while he or she watches the display device.

The touch sensor has a simple configuration capable of reducing the erroneous operations. The user can also perform an input action without using a separate input device and can quickly and easily manipulate a display device through the contents displayed on the screen. Thus, the touch sensor has been applied to various display devices.

The touch sensor may be classified into an add-on type touch sensor, an on-cell type touch sensor, and an integrated type (or in-cell type) touch sensor, depending on its structure. The add-on type touch sensor may be configured such that the display device and a touch panel including the touch sensor are individually manufactured, and then the touch panel may be attached to an upper substrate of the display device. The on-cell type touch sensor may be configured such that the touch sensor may be directly formed on the surface of an upper glass substrate of the display device. The integrated type touch sensor may be configured such that the touch sensor may be mounted inside the display device to thereby achieve a thin profile display device and increase the durability of the display device.

In the integrated type touch sensor, it is possible to provide advantages of a thin profile and an improvement in durability because common electrodes of the display device are shared with touch electrodes of the touch sensor.

Accordingly, the integrated type touch sensor has caught attention in that it is possible to achieve a thin shape of the display device and enhance a durability of the display device, thereby resolving the problems of the add-on type and on-cell type touch sensors. The integrated type touch sensor may be divided into an optical touch sensor and a capacitive touch sensor, depending on a method for sensing a touched portion. The capacitive touch sensor may be subdivided into a self capacitive touch sensor and a mutual capacitive touch sensor.

The self capacitive touch sensor may have a plurality of independent patterns in a touch area of a touch sensing panel, and changes in a capacitance of each independent pattern are measured, thereby deciding whether or not a touch operation is performed. The mutual capacitive touch sensor may have X-axis direction electrode strings (for example, driving electrode strings) and Y-axis direction electrode strings (for example, sensing electrode strings) which cross over each other in the touch area of the touch sensing panel to form a matrix, applies a driving pulse to the X-axis electrode strings, and senses changes in voltages generated in sensing nodes defined as the crossings of the X-axis direction electrode strings and the Y-axis direction electrode strings through the Y-axis direction electrode strings, thereby deciding whether or not a touch operation is performed.

However, in the mutual capacitive touch sensor, a mutual capacitance between the X-axis direction electrode strings and the Y-axis direction electrode strings is small, but parasitic capacitance generated in the data lines and gate lines arranged in the display device are large. Accordingly, there are some problems making difficult to decide accurate touch positions in the mutual capacitive touch sensor.

Also, the mutual capacitive touch sensor necessarily has complicated routing wire construction because it has to have touch driving routing wires connected to touch driving electrode strings (for example, the X-axis direction electrode strings) and touch sensing routing wires connected to touch sensing electrode strings (for example, the Y-axis direction electrode strings) for multi-touch perception.

For the reason mentioned above, the self capacitive touch sensor with a simple routing wire construction and a high touch sensibility was widely used.

Figure 1:
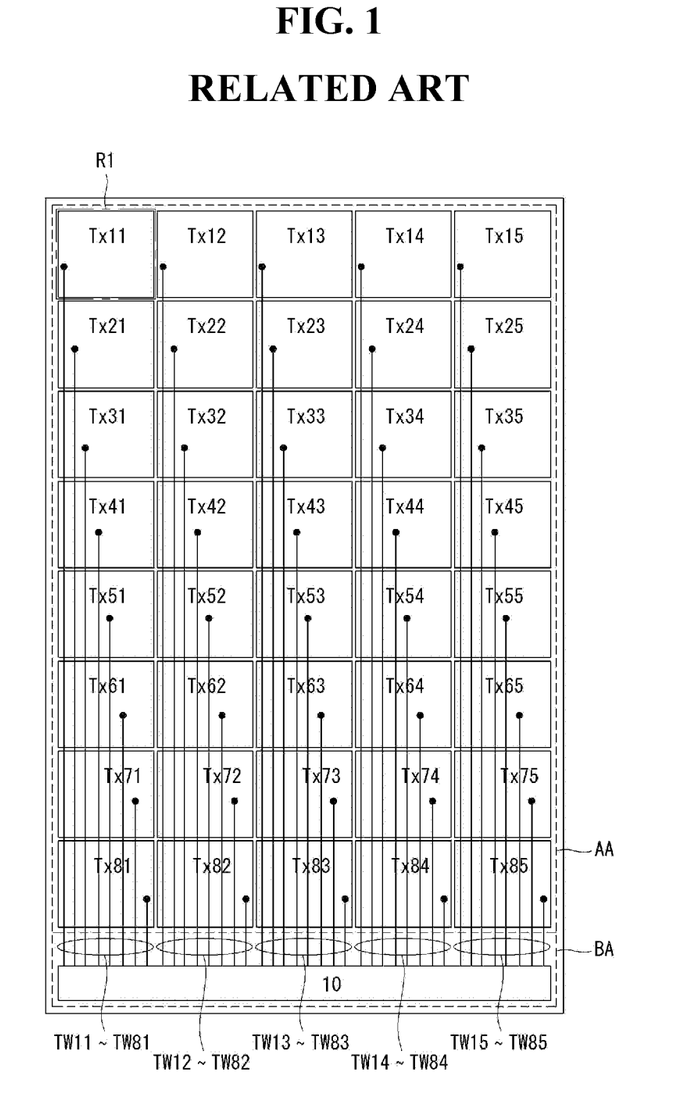
FIG. 1 is a planar view illustrating a touch sensor integrated type display device according to a related art.
Figure 2:
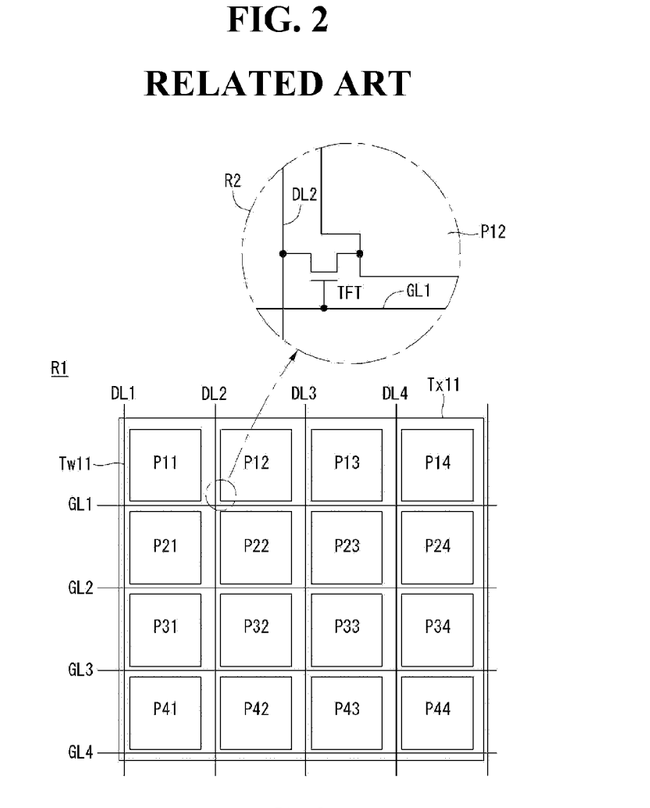
FIG. 2 is a planar view illustrating a region R1 shown in FIG. 1.
Figure 3:
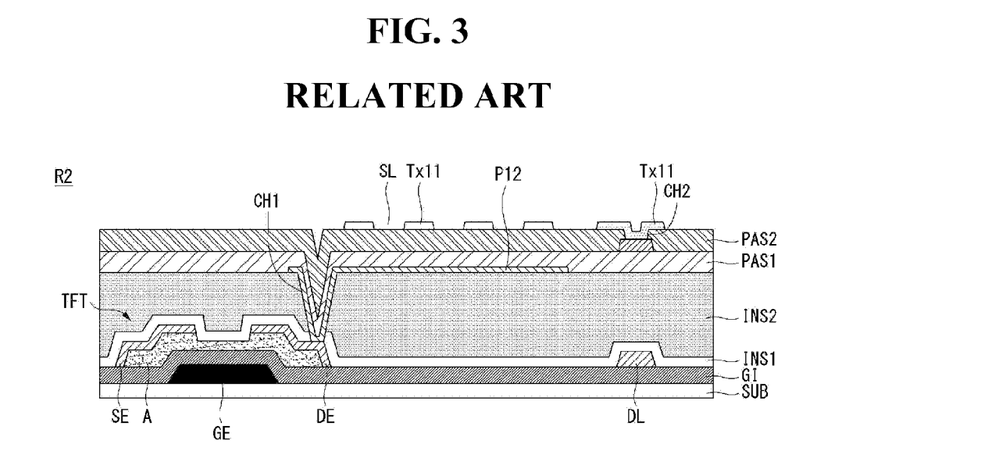
FIG. 3 is a planar view illustrating a region R2 shown in FIG. 2.

Hereinafter, a related art self capacitive touch sensor integrated type liquid crystal display device (hereinafter, simply referred to as "touch sensor integrated type display device") is described with reference to FIGS. 1 to 3. FIG. 1 is a planar view showing the related art touch sensor integrated type display device, FIG. 2 is a planar view showing a region R1 shown in FIG. 1, and FIG. 3 is a planar view showing a region R2 shown in FIG. 2.

Referring to FIG. 1, the touch sensor integrated display device includes an active area AA, in which touch electrodes are arranged and data are displayed, and a bezel area BA positioned outside the active area AA. In the bezel area BA, various wires and a source and touch driving integrated circuit 10 are disposed.

The active area AA includes a plurality of touch electrodes Tx11 to Tx15, Tx21 to Tx25, . . . , and Tx81 to Tx85, and a plurality of touch routing wires TW11 to TW15, TW21 to TW25, . . . , and TW81 to TW85 connected to the plurality of touch electrodes Tx11 to Tx15, Tx21 to Tx25, . . . , and Tx81 to Tx85, respectively. The plurality of touch electrodes Tx11 to Tx15, Tx21 to Tx25, . . . , and Tx81 to Tx85 are divided in a first direction (e.g. x-axis direction) and a second direction (e.g. y-axis direction) which cross each other. The plurality of routing wires TW11 to TW15, TW21 to TW25, . . . , and TW81 are arranged in parallel to each other along the second direction.

The plurality of touch electrodes Tx11 to Tx15, Tx21 to Tx25, . . . , and Tx81 to Tx85 are formed by dividing a common electrode of a display device. The plurality of touch electrodes Tx11 to Tx15, Tx21 to Tx25, . . . , and Tx81 may be operated as common electrodes during a display mode for displaying data, and operated as touch electrodes during a touch mode for perceiving touch positions.

The touch driving integrated circuit 10 disposed in bezel area BA supplies display data to data lines in synchronization with driving of gate lines (not shown) of the display, and supplies a common voltage to the touch electrodes Tx11 to Tx15, Tx21 to Tx25, . . . , and Tx81 to Tx85 during the display mode. Also, the integrated circuit 10 supplies a touch driving voltage to the touch electrodes Tx11 to Tx15, Tx21 to Tx25, . . . , and Tx81 to Tx85, and determines touch positions at which touches are performed by scanning changes of capacitance in touch electrodes before and after the touch is performed during the touch mode. The various wires disposed in bezel area BA include the touch routing wires TW11 to TW15, TW21 to TW25, . . . , and TW81 to TW85, gate lines and data lines (not shown) extended from the active area AA and connected to the integrated circuit 10.

Referring to FIGS. 2 and 3, the related art touch sensor integrated type display device includes thin film transistors TFT disposed on a substrate SUB, pixel electrodes P11 to P44 respectively connected to drain electrodes of the thin film transistors TFT, and a touch electrode Tx11 disposed to overlap the pixel electrodes P11 to P44, thereby generating a horizontal electric field between the pixel electrodes P11 to P44 and the touch electrode Tx11.

The thin film transistors TFT each includes a gate electrode GE extended from a gate line GL formed on the substrate SUB, a semiconductor active layer A disposed on a gate insulation layer GI covering the gate line GL and gate electrode GE to overlap a portion of the gate line GL, and a source electrode SE and a drain electrode DE disposed on the semiconductor active layer A and separated from each other at a predetermined distance. The source electrode SE is extended from a data line DL disposed on the gate insulation layer GI.

The pixel electrode Px is disposed on a second insulation layer INK on first insulation layer INS1 covering the thin film transistor TFT. The pixel electrode Px is connected to the drain electrode DE of the thin film transistor TFT exposed via first contact hole CH1 passing through the first and second insulation layers INS1 and INS2.

The pixel electrode Px is covered with a first passivation layer PAS1. The touch routing wire TW11 is arranged on the first passivation layer PAS1 to overlap a data line DL. The touch routing wire TW11 is covered with a second passivation layer PAS2.

The touch electrode Tx11 is disposed on the second passivation layer PAS2 and connected to the touch routing wire TW11 via a second contact hole CH2 passing through the second passivation layer PAS2. The touch electrode Tx11 has a plurality of slits to generate a horizontal electric field together with the pixel electrode Px.

In the touch sensor integrated type display device, when a user makes fingers or stylus pens to contact the active area AA, it is possible to perceive the touch positions by measuring changes of capacitance on touch electrodes before and after the touch is performed.

However, in the touch sensor integrated type display device, different signals are supplied at different times to the touch electrodes during the display operation period and the touch operation period because the touch electrodes are operated as common electrodes or touch electrodes in such a time-division method. That is, a common voltage is supplied to the touch electrodes during the display operation period, and a touch driving pulse is supplied to the touch electrodes during the touch operation period. Accordingly, there are some problems such as incorrect operations of the touch sensor integrated type display device by a ripple voltage generated to the touch electrodes due to the touch driving pulse.

Furthermore, the touch electrodes suffer from adverse affection due to various capacitance components generated by the gate line, the data line, pixel electrode and so on, during the touch operation period. In particular, when display patterns are changed from white to black or black to white, a basic value of raw data sensing a touch performance may be varied due to the various capacitance components, thereby generating a DTX (Display to Touch Crosstalk) phenomenon in which a touch is perceived although no touch was performed.

SUMMARY OF THE INVENTION

Embodiments of the invention provide touch sensor integrated type display devices capable of improving touch sensibility due to the ripple voltage and DTX phenomenon.

In one object of the invention, there is a touch sensor integrated type display device including a plurality of gate lines and a plurality data lines configured to cross over each other; a plurality of thin film transistors disposed at crossings of the gate lines and the data lines; a plurality of pixel electrodes configured to be respectively connected to the thin film transistors and be disposed between the data lines so that each of the gate lines crosses over pixel electrodes disposed on a same line; a plurality of touch electrodes configured to overlap the gate lines and the data lines without contacting and overlapping the pixel electrodes; a plurality of touch routing wires configured to be respectively connected to the plurality of touch electrodes and be arranged in parallel with each other; and a common electrode configured to overlap the data lines, the gate lines, the pixel electrodes and the touch electrodes.

Each of the plurality of touch electrodes includes a lattice shape pattern having a plurality of windows so that one window surrounds at least one pixel electrode.

Each of the plurality of gate lines crosses over center portions of pixel electrodes disposed on the same line, and includes a gate electrode of the thin film transistor.

The plurality of gate lines are disposed on a substrate, the plurality of thin film transistors are disposed on an insulation layer configured to cover the plurality of gate lines, the common electrode is disposed on an insulation layer covering the plurality of thin film transistor, the plurality of touch routing wires are disposed in parallel with each other on a first passivation layer covering the common electrode, the plurality of touch electrodes are disposed on a second passivation layer covering the plurality of touch routing wires, the plurality of pixel electrodes are respectively connected to drain electrodes of the plurality of thin film transistors via first contact holes passing through the first insulation layer, the first and second passivation layers, and the plurality of touch electrodes are respectively connected to the plurality of touch routing wires via second contact holes passing through the second passivation layers.

During one horizontal period, a common voltage is supplied to the common electrode, and a touch driving voltage is supplied to the plurality of touch sensor integrated type display device via the plurality of routing wires.

Each of the plurality of windows surrounds one pixel electrode.

Each of the plurality of windows surrounds two or more pixel electrodes.

Each of the plurality of transistors has a gate electrode, a source electrode extended from the data line and having two branches facing to each other, and a drain electrode connected to the pixel electrode.

The gate electrode is a portion of the gate line.

The drain electrode is inserted into a space between the branches of the source electrode to face to the branches.

According to the touch sensor integrated type display device, it is possible to prevent from generating a ripple voltage to the common electrode since the common voltage is continuously supplied to the common electrode for one horizontal period.

Also, it is possible to remove the DTX phenomenon because parasitic capacitances between gate lines and pixel electrodes are removed by the common electrode.

Also, it is possible to improving touch sensibility because parasitic capacitances between touch electrodes and data lines are removed by providing the common electrode between the touch electrodes and data lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Where possible, the same or similar reference numbers may be used throughout the drawings to refer to the same or similar parts. In the following description, a self capacitive touch sensor integrated type liquid crystal display may be used as an example of a touch sensor integrated type display device, but embodiments are not limited thereto. Therefore, hereinafter a self capacitive touch sensor integrated type liquid crystal display is simply referred to as a touch sensor integrated type display device.

Figure 4:
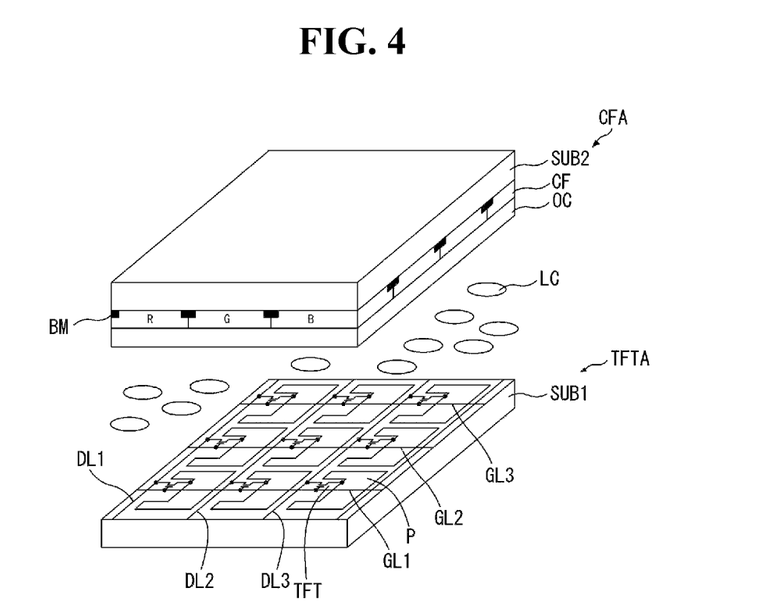
FIG. 4 is a partial exploded perspective view schematically illustrating a touch sensor integrated type display device according to an exemplary embodiment of the invention.
Figure 5:
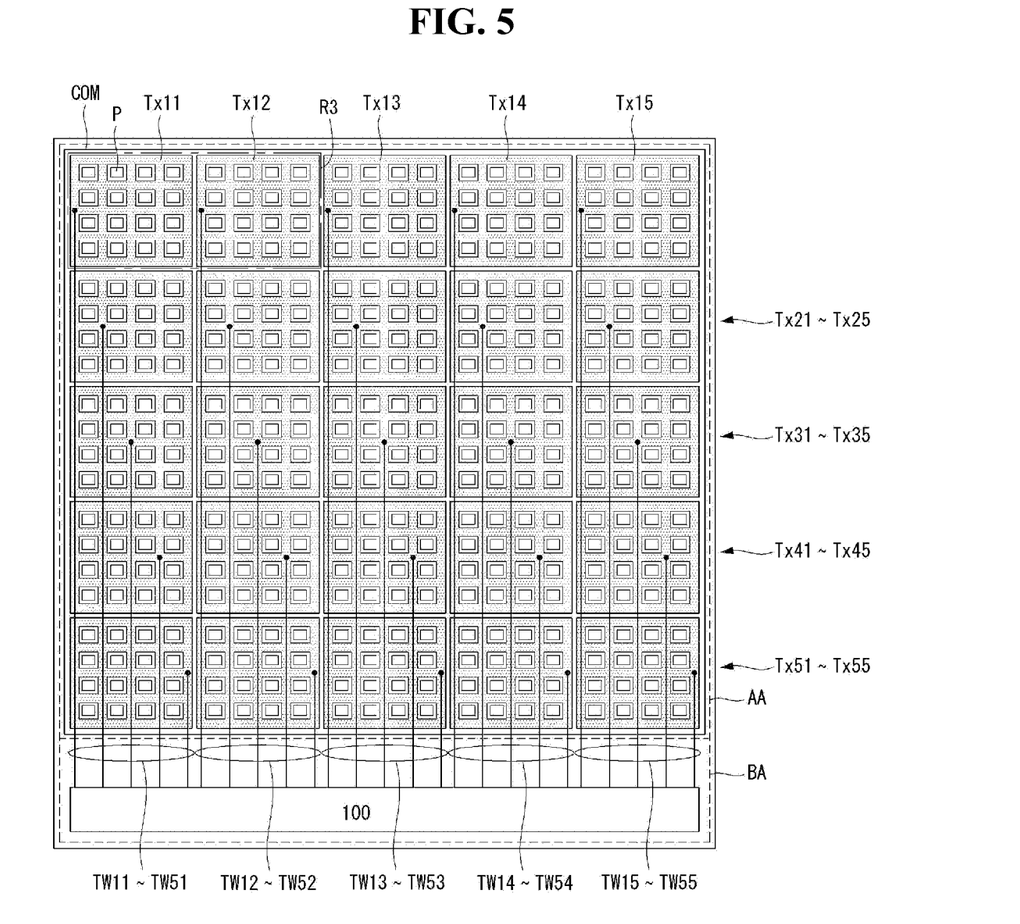
FIG. 5 is a planar view illustrating a touch sensor integrated type display device according to an exemplary embodiment of the invention.
Figure 6:
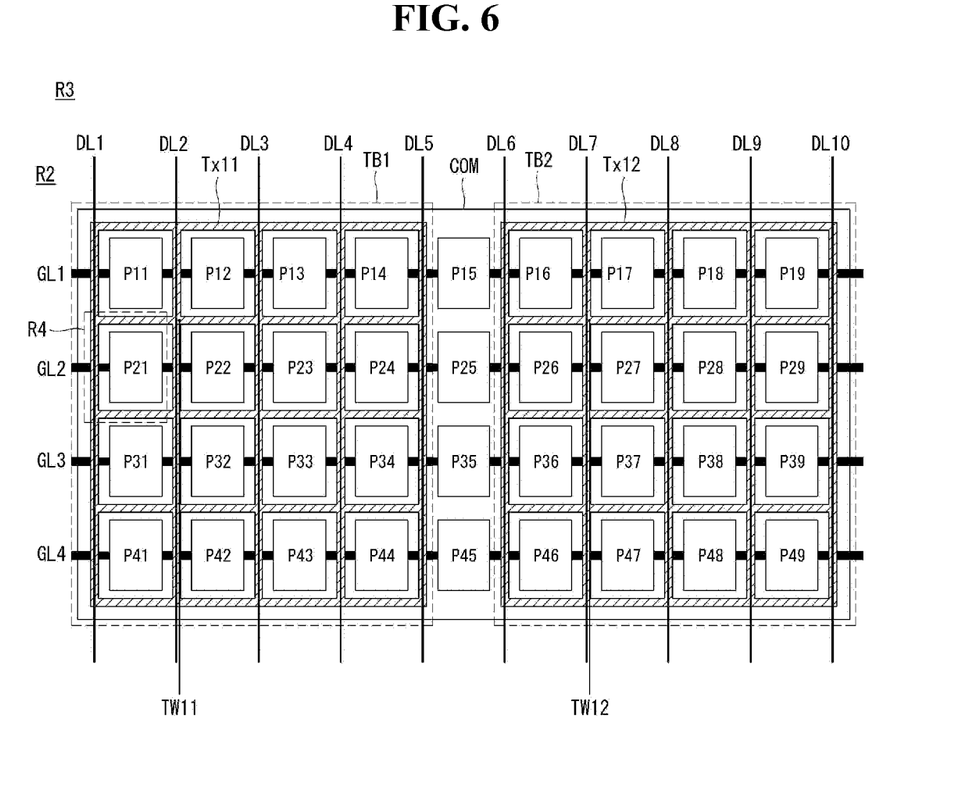
FIG. 6 is a planar view illustrating a region R3 shown in FIG. 5.

A touch sensor integrated type display device, to which example embodiments of the invention are applied, is described with reference to FIGS. 4 to 6. FIG. 4 is a partial exploded perspective view schematically illustrating a touch sensor integrated type display device according to an exemplary embodiment of the invention, FIG. 5 is a planar view illustrating a touch sensor integrated type display device according to an exemplary embodiment of the invention, and FIG. 6 is a planar view illustrating a region R3 shown in FIG. 5.

Referring to FIG. 4, the touch sensor integrated type display device includes a liquid crystal display panel LCP having a thin film transistor (TFT) array TFTA and a color filter array CFA which are positioned opposite each other with a liquid crystal layer (not shown) interposed therebetween.

The TFT array TFTA includes a plurality of gate lines G1, G2 and G3 which may be arranged in parallel in a first direction (for example, x-axis direction) on a first substrate SUB1, a plurality of data lines D1, D2 and D3 which may be arranged in parallel in a second direction (for example, y-axis direction) to cross over the plurality of gate lines G1, G2 and G3, thin film transistors TFT disposed at crossings of the gate lines G1, G2 and G2 and the data lines D1, D2 and D3, a plurality of pixel electrodes P for charging data voltages to liquid crystal cells, a plurality of touch electrodes (Tx11 to Tx55 of FIGS. 5 and 6) positioned to surround each of the plurality of pixel electrodes P and overlap the data lines DL1, DL2 and DL3 and the gate lines GL1, GL2 and GL3, and a common electrode (COM of FIGS. 5 and 6) disposed to overlap the pixel electrodes P, the data lines DL1, DL2 and DL3 and the gate lines GL1, GL2 and GL3.

The color filter array CFA includes black matrices (not shown) and color filters (not shown), which may be disposed on a second substrate SUB2. Polarizing plates POL1 (not shown) and POL2 (not shown) are respectively attached to external surfaces of the first substrate SUB1 and the second substrate SUB2 of the liquid crystal display panel LCP. Alignment layers (not shown) for setting a pre-tilt angle of liquid are respectively formed on inner surfaces of the first and second substrates SUB1 and SUB2 contacting the liquid crystals. A column spacer is disposed between the TFT array TFTA and the color filter array CFA of the liquid crystal display panel LCP to maintain cell gaps of the liquid crystal cells.

The common electrode may be disposed on the second substrate SUB2 in a vertical electric field driving manner, such as a twisted nematic (TN) mode and a vertical alignment (VA) mode. Further, the common electrode may be disposed on the first substrate SUB1 along with the pixel electrodes P in a horizontal electric field driving manner, such as an in-plane switching (IPS) mode and a fringe field switching (FFS) mode. In the following description, embodiments of the invention will be described based on the horizontal electric field driving manner by way of example.

Referring to FIGS. 5 and 6, the touch sensor integrated display device according to the embodiment of the invention includes an active area AA and a bezel area BA positioned outside the active area AA. The active area AA is an area where data lines DL1 to DL10, gate lines GL1 to GL 4, a common electrode COM, pixel electrodes P, P11 to P49, touch electrodes Tx11 to Tx55, touch routing wires TW11 to TW55 and so on are arranged and data are displayed. The bezel area BA is an area where various wires and source/touch controller IC 100 may be disposed.

The data lines DL1 to DL10 and the gate lines GL1 to GL4 are arranged to cross to each other. For example, the data lines DL1 to DL10 are arranged in a first direction (e.g. x-axis direction), and the gate lines GL1 to GL4 are arranged in a second direction (e.g. y-axis direction).

The pixel electrodes P11 to P49 are disposed between the data lines DL1 to DL10 to cross each of the gate lines GL1 to GL4. That is, each of the gate lines GL1 to GL4 crosses the pixel electrodes P11 to P19, P21 to P29, P31 to P39, P41 to P49 disposed on a same line respectively. According to the arrangement, a half area of each of two pixel electrodes (e.g. P11, P21) neighbored to each other in the y-axis direction is positioned between the gate lines (e.g. GL1 and GL2) neighbored to each other and between the data lines (e.g. DL1 and DL2) neighbored to each other.

As shown in FIG. 6, each of the touch electrodes Tx11 and Tx12 overlaps the data lines DL1 to DL5 and DL6 to DL10 respectively, and includes a lattice shape pattern having a plurality of windows to surround the pixel electrodes P11 to P14, P21 to P24, P31 to P34 and P41 to P44, and P16 to P19, P26 to P29, P36 to P39 and P46 to P49 in a non-contacting manner, respectively.

The common electrode COM is disposed at a remaining area excluding areas where the thin film transistors are disposed. That is, the common electrode COM is disposed to overlap the data lines DL1 to DL10, the gate lines GL1 to GL4, the pixel electrodes P11 to P49, and touch electrodes Tx11 to Tx12.

As shown in FIG. 5, touch routing wires TW11 to TW15, TW21 to TW25, . . . , and TW51 to TW55 are connected to the touch electrodes Tx11 to Tx15, Tx21 to Tx25, . . . , and Tx51 to Tx55 respectively, and arranged in parallel with the second direction. It is preferable that the touch routing wires TW11 to TW15, TW21 to TW25, . . . , and TW51 to TW55 are disposed to overlap the data lines DL1 to DL10, thereby improving aperture ratio. Each of the touch routing wires TW11 to TW15, TW21 to TW25, . . . , and TW51 to TW55 are connected to each of the touch electrodes Tx11 to Tx15, Tx21 to Tx25, . . . , and Tx51 to Tx55 to form touch blocks. For example, one touch block TB1 is formed by connecting the touch routing wire TW11 to the touch electrode Tx11, and another touch block TB2 may be formed by connecting the touch routing wire TW12 to the touch electrode Tx12 as shown in FIG. 6. Pixel electrodes P15, P25, P35 and P45 may be disposed between the touch blocks TB1 and TB2 neighbored to each other.

Figure 7:
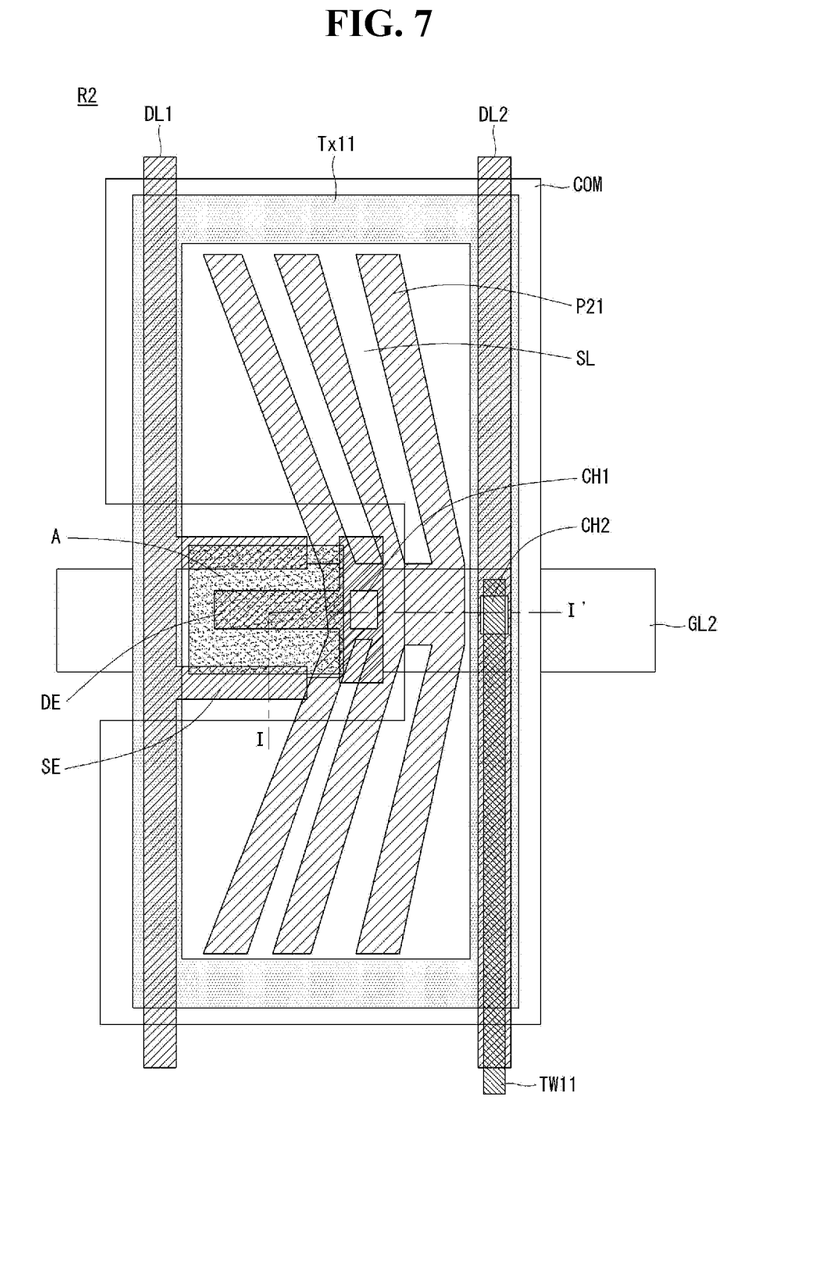
FIG. 7 is a planar view illustrating a region R4 shown in FIG. 6.
Figure 8:
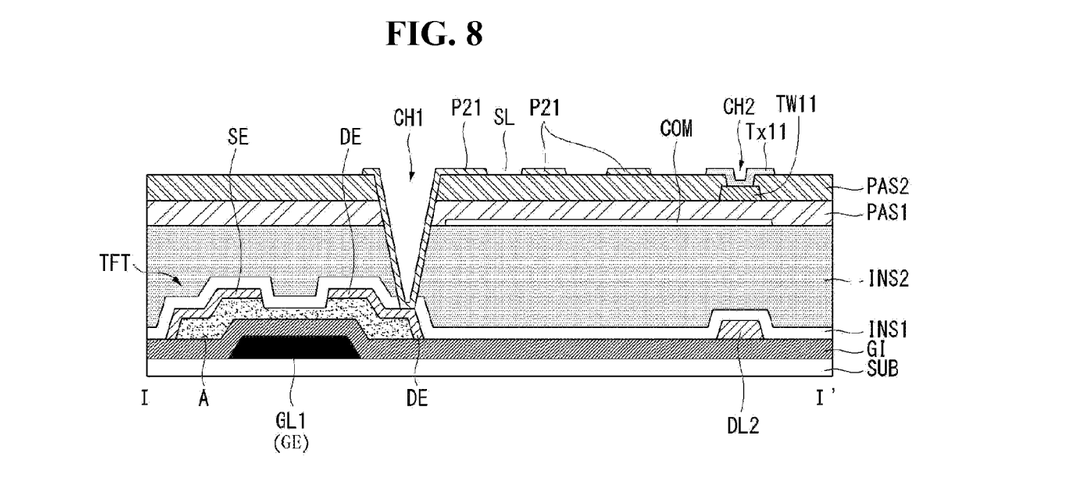
FIG. 8 is a cross-sectional view taken along line I-I' of FIG. 7.

Hereinafter, a connection relationship between the touch routing wires and the touch electrodes of the touch sensor integrated type display device according to the embodiment of the invention will be further described in detail with reference to FIGS. 7 and 8. FIG. 7 is a planar view illustrating a region R4 shown in FIG. 6, and FIG. 8 is a cross-sectional view taken along line I-I' of FIG. 7. The description is focused on one pixel area for making the explanation short and clear.

Referring to FIGS. 7 and 8, the touch sensor integrated type display device according to the embodiment of the invention includes the gate line GL2 and the data lines DL1 and DL2, the thin film transistor TFT, the pixel electrode P21, the touch electrode Tx11 and the common electrode COM. The gate line GL2 and the data lines DL1 and DL2 are arranged on the first substrate SUB1 to cross over each other. The thin film transistor TFT is disposed at a crossing area of the gate line GL2 and the data lines DL1 and DL2. The pixel electrode P21 is disposed between the data lines DL1 and DL2 neighbored to each other so that to the gate line GL2 crosses over a substantial center portion of the pixel electrode P21. The touch electrode Tx11 has a window surrounding and exposing the pixel electrode P21. The common electrode COM overlaps the gate line GL2, the data lines DL1 and DL2, the pixel electrode P21 and the touch electrode Tx11 excluding the thin film transistor TFT. It is described that the window of the touch electrode surrounds one pixel electrode but is not limited to this embodiment. It should be understood that the window of the touch electrode may surround two or more pixel electrodes.

In the construction, the gate lines GL1 to GL4 are arranged on the first substrate SUB1 in parallel with each other. A gate insulation layer GI is disposed on the first substrate to cover the gate lines GL1 to GL4. The thin film transistors TFT and the data lines DL1 to DL10 are disposed on the gate insulation layer GI. An active layer A of the thin film transistor TFT is disposed on the gate insulation layer GI to overlap a portion of each the gate lines GL1 to GL4. A source electrode SE and a drain electrode DE of the thin film transistor TFT are disposed on the active layers A to be separated from each other. The source electrode SE may have two branches facing each other and extended from each of the data lines DL1 to DL10. The drain electrode DE is inserted into a space formed between the branches of the source electrode SE to face the branches.

The embodiment of the invention has described, as an example, a thin film transistor having a gate bottom structure, in which the gate electrode is formed under the source and drain electrodes, but is not limited to this example. It should be understood that a thin film transistor having a gate top structure, in which the gate electrode is formed on the source and drain electrodes, may be used. Since the thin film transistor having the gate top structure is known to those in the art, a detailed description thereof will be omitted.

A first insulation layer INS1 and a second insulation layer INS2 are sequentially disposed on the gate insulation layer GI to cover the thin film transistors TFT and the data lines DL1 to DL10.

The common electrode COM is disposed on the second insulation layer INS2. The common electrode COM is disposed on an area excluding another area where the thin film transistor TFT is formed. A first passivation layer PAS1 is disposed on the second insulation layer INS2 to cover the common electrode COM.

The touch routing wires TW11 and TW12 are disposed on the first passivation layer PAS1 to overlap the data lines DL2 and DL7 respectively. A second passivation layer PAS2 is disposed on the first passivation layer PAS1 to cover the touch routing wires TW11 and TW12.

The pixel electrode P21 and the touch electrodes Tx11 and Tx12 are disposed on the second passivation layer PAS2 so that they do not contact to each other.

The pixel electrode P21 is disposed between the data lines DL1 and DL2 neighbored to each other so that to the gate line GL2 crosses over a substantial center portion of the pixel electrode P21. The pixel electrodes P21 is connected to the drain electrode DE of the thin film transistor TFT exposed via the first contact hole CH1 passing through the first and second passivation layer PAS1 and PAS2, and the first and second insulation layer INS1 and INS2.

The touch electrode Tx11 includes a lattice shape pattern having a plurality of windows so that one window surrounds one pixel electrode. However, the invention is not limited thereto. For example, one window of the touch electrode may surround two or more pixel electrodes.

Figure 9:
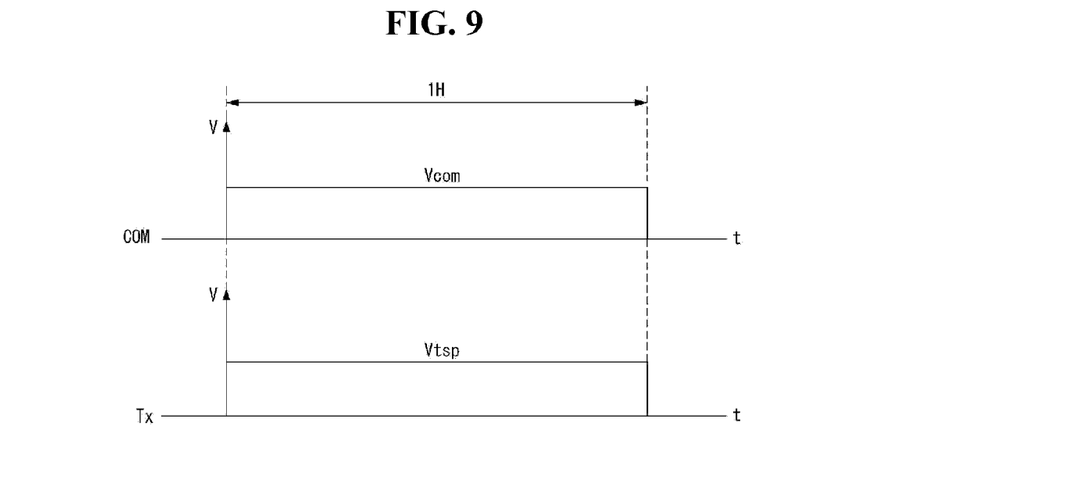
FIG. 9 is a timing diagram illustrating an operation of the touch sensor integrated type display devices according to the exemplary embodiment of the invention.

Hereinafter, display and touch operations of the touch sensor integrated type display device according to the embodiment of the invention will be described with reference to FIG. 9. FIG. 9 is a timing diagram illustrating an operation of the touch sensor integrated type display devices according to the exemplary embodiment of the invention.

Referring to FIG. 9, in the touch sensor integrated type display device according to the embodiment of the invention, a display operation and a touch operation are not performed at separate times in a time-division method but are independently performed. In the touch sensor integrated type display device according to the embodiment of the invention, during one horizontal period, a common voltage Vcom is continuously supplied to the common electrode COM, and a touch driving voltage Vtsp is continuously supplied to the touch electrodes Tx11 to Tx15, Tx21 to Tx25, Tx31 to Tx35, Tx41 to Tx45, and Tx51 to Tx55. To this end, the common electrode COM for the display operation and the touch electrodes Tx11 to Tx15, Tx21 to Tx25, Tx31 to Tx35, Tx41 to Tx45, and Tx51 to Tx55 for the touch operation are independently formed as mentioned above.

Accordingly, it is possible to prevent a ripple voltage due to the touch driving voltage Vtsp, since it is unnecessary to drive the touch sensor integrated type display device according to the time-division method in which one horizontal period is divided into a display operation period and a touch operation period, and the common voltage is continuously supplied to the common electrode during the one horizontal period.

Furthermore, it is possible to omit components necessary for implementing the time-division method, since it is unnecessary to drive the touch sensor integrated type display device according to the time-division method. Accordingly, it is possible to manufacture the source/touch controller IC 100 having a simple construction.

Furthermore, it is possible to prevent parasitic capacitances from being generated between the touch electrodes Tx and the data lines DL, since the touch electrodes Tx overlap the data lines DL, and the common electrode COM is disposed between the touch electrodes Tx and the data lines DL. Accordingly, it is possible to improve touch sensibility of the touch sensor integrated type display device according to the embodiments of the invention.

Also, in the touch sensor integrated type display device according to the embodiments of the invention, each of the gate lines GL crosses over the pixel electrodes P disposed on a same line, respectively. According to the above-mentioned arrangement, liquid crystals between the thin film transistor array TFTA and the color filter array CFA are normally driven, and horizontal electric fields are formed between the pixel electrodes P and the common electrode COM at areas where the gate lines GL, the pixel electrodes P and the common electrode COM overlap with each other. Also, it is possible for the common electrode COM to prevent parasitic capacitance from being generated between the gate lines GL and the pixel electrodes P. Accordingly, although the display patterns are changed from white to black or black to white, it is possible to remove the DTX (Display to Touch Crosstalk) phenomenon since it is possible to prevent adverse affects due to the parasitic capacitance.

While example embodiments of the present invention have been described in detail with reference to the drawings, it will be understood by those skilled in the art that the invention can be implemented in other specific forms without changing the technical spirit or essential features of the invention. For example, numbers of the touch electrodes, the common electrode, the routing wires and so on and arrangement thereof are selected for clarity. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A touch sensor integrated type display device comprising a first substrate:
    a plurality of gate lines and a plurality of data lines configured to cross over each other;
    a plurality of thin film transistors disposed at crossings of the gate lines and the data lines;
    a plurality of pixel electrodes on the first substrate, the plurality of pixel electrodes configured to be respectively connected to the thin film transistors and be disposed between the data lines so that each of the gate lines crosses over pixel electrodes disposed on a same line;
    a plurality of touch electrodes on the first substrate, the plurality of touch electrodes configured to overlap the gate lines and the data lines without contacting and overlapping the pixel electrodes, the plurality of touch electrodes configured as self-capacitive touch electrodes;
    a plurality of touch routing wires configured to be respectively connected to the plurality of touch electrodes and be arranged in parallel with each other; and
    a common electrode on the first substrate, the common electrode separate from the plurality of touch electrodes and configured to overlap the data lines, the gate lines, the pixel electrodes and the touch electrodes.

2. The touch sensor integrated type display device of claim 1, wherein each of the plurality of touch electrodes includes a lattice shape pattern having a plurality of windows so that one window surrounds at least one pixel electrode.

3. The touch sensor integrated type display device of claim 2, wherein each of the plurality of gate lines crosses over center portions of pixel electrodes disposed on the same line, and includes a gate electrode of the thin film transistor.

4. The touch sensor integrated type display device of claim 1, wherein the plurality of gate lines are disposed on the first substrate,
    the plurality of thin film transistors are disposed on a first insulation layer configured to cover the plurality of gate lines,
    the common electrode is disposed on a second insulation layer covering the plurality of thin film transistors,
    the plurality of touch routing wires are disposed in parallel with each other on a first passivation layer covering the common electrode,
    the plurality of touch electrodes are disposed on a second passivation layer covering the plurality of touch routing wires,
    the plurality of pixel electrodes are respectively connected to drain electrodes of the plurality of thin film transistors via first contact holes passing through the first insulation layer, the first and second passivation layers, and
    the plurality of touch electrodes are respectively connected to the plurality of touch routing wires via second contact holes passing through the second passivation layers.

5. The touch sensor integrated type display device of claim 1, wherein during one horizontal period, a common voltage is supplied to the common electrode, and a touch driving voltage is supplied to the plurality of touch electrodes via the plurality of touch routing wires.

6. The touch sensor integrated type display device of claim 2, wherein each of the plurality of windows surrounds one pixel electrode.

7. The touch sensor integrated type display device of claim 2, wherein each of the plurality of windows surrounds two or more pixel electrodes.

8. The touch sensor integrated type display device of claim 2, wherein each of the plurality of transistors has a gate electrode, a source electrode extended from the data line and having two branches facing each other, and a drain electrode connected to the pixel electrode.

9. The touch sensor integrated type display device of claim 8, wherein the gate electrode is a portion of the gate line.

10. The touch sensor integrated type display device of claim 9, wherein the drain electrode is inserted into a space between the branches of the source electrode to face the branches.

11. The touch sensor integrated type display device of claim 1, wherein the plurality of pixel electrodes and the plurality of touch electrodes are of a same layer.

12. The touch sensor integrated type display device of claim 1, further comprising a second substrate, and a liquid crystal layer in between the first substrate and the second substrate.

* * * * *